Patented Mar. 7, 1944

2,343,744

UNITED STATES PATENT OFFICE 2,343,744

SEPARATION AND PURIFICATION OF AROMATIC COMPOUNDS

Robert E. Burk, Cleveland Heights, Ohio, assignor to The Standard Oil Company, Cleveland, Ohio, a corporation of Ohio No Drawing. Application December 17, 1941.
Serial No. 423,303

14 Claims. (Cl. 260—674)

Aromatic compounds, benzene, toluene, etc., quite commonly occur in mixtures with non-benzenoid hydrocarbons, and it is desirable to separate the respective components, as for the purpose of special usages of the aromatics or the non-aromatics respectively, and in some cases it is desired to purify aromatic mixtures or individual hydrocarbons to a more or less complete state of purity. In accordance with the present invention, it now becomes possible to make such separations, and purify aromatic hydrocarbons, to such extent as desired, with particular convenience and accuracy of control. Other objects and advantages will appear as the description proceeds.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

A mixture of aromatic and non-aromatic hydrocarbons, as occurring for instance in petroleums or in hydrocarbon distillates from other sources, or as a result of aromatizing or other processing of petroleum hydrocarbons or distillates from other sources, is, in accordance with the invention, subjected to the action of a liquid hydrofluoric acid solution of boron fluoride. A complex is formed between the inorganic liquid or constituents thereof with benzene for instance or with toluene, etc. With the stirring of the liquid reagent and the hydrocarbons to be treated, and then allowing the mixture to become quiescent, a lower layer of heavy oily character involving the aromatic halide compound or compounds separates. The temperature of treatment for the reaction may be minus 25 to +50° C. or higher, up to 150° C. At higher temperatures cracking of non-benzenoid hydrocarbons present is prone to occur. Temperatures of 0 to 15° C., and particularly room temperature, are generally the most convenient. Pressure is maintained in the reaction zone sufficient to keep the hydrogen fluoride in liquid state and the boron fluoride in solution or state of loose combination. Boron fluoride normally is a gas, and the amount dissolved in the hydrogen fluoride may be in general one-half to 50 mol per cent or more. A convenient measure is the partial pressure of the boron fluoride, and this may be for instance 50 to 150 pounds per square inch. Boron fluoride may be added until no more is absorbed. The amount of the liquid reagent employed to treat the aromatic hydrocarbons may be 5 to 300 volume per cent of the hydrocarbon, depending somewhat upon the conditions and amount of aromatic present in the mixture. The reaction occurs rather promptly. Generally a half hour is sufficient, and with efficient equipment and conditions shorter times are satisfactory. Exposure to the reagent for more than an hour is generally unnecessary.

The lower layer or aromatic halide complex formed is separated from the upper layer of non-benzenoid hydrocarbons in convenient manner, as by settling, decantation, centrifuging, use of a contact tower with packing wetted with liquid hydrogen fluoride or the lower layer material, etc., and then the aromatic halide complex may be decomposed to recover its components. On releasing the pressure, hydrogen fluoride and boron fluoride separate from the complex, and by applying heat the complex is entirely decomposed, it being unnecessary in general to heat over 19° C. at atmospheric pressure, as hydrogen fluoride distills off at this temperature. The hydrogen fluoride and boron fluoride may be collected, together or separately, and the hydrogen fluoride may be re-liquefied for further use. In some cases it is not necessary to completely separate the hydrogen fluoride and boron fluoride to re-use them. A continuous arrangement of treatment thus is readily feasible, in which the raw material hydrocarbon mixture is brought first into the reaction zone and sufficient mixing agitation with the liquid boron fluoride and hydrogen fluoride reagent, and is then allowed to settle and the layers are separated and the halide complex layer on being passed to a decomposing zone and the pressure being reduced, with application of heat as desired, for hastening the process, the halides are driven off to a collecting or compressing and cooling zone, whence they may be returned to the reaction zone for operation on fresh in-coming hydrocarbon mixture.

Aromatics in illuminating oil hydrocarbon distillates and which are detrimental to the illuminating qualities can by the present process be particularly advantageously recovered, and thereby at the same time leave the illuminating oil, or kerosene, etc., importantly improved.

Other modes of applying the principle of the invention may be employed, change being made as regards the details described, provided the features stated in any of the following claims, or the equivalent of such, be employed.

I therefore particularly point out and distinctly claim as my invention:

1. A process of separating aromatic hydrocarbons from mixtures of aromatic and non-aromatic hydrocarbons, which comprises subjecting the mixture to the action of a liquid hydrogen fluoride solution of boron fluoride under conditions such that the principal action is the formation of an aromatic halide complex, separating the resultant upper and lower layers the latter comprising an aromatic halide complex, subjecting the lower layer to heat to decompose the aromatic halide complex, and driving off the boron fluoride and hydrogen fluoride and collecting the same.

2. A process of separating aromatic hydrocarbons from mixtures of aromatic and non-aromatic hydrocarbons, which comprises subjecting the mixture to the action of a liquid hydrogen fluoride solution of boron fluoride under conditions such that the principal action is the formation of an aromatic halide complex, separating the resultant upper and lower layers the latter comprising an aromatic halide complex, subjecting the lower layer to heat to decompose the aromatic halide complex, and driving off the boron fluoride and hydrogen fluoride.

3. A process of separating aromatic hydrocarbons from mixtures of aromatic and non-aromatic hydrocarbons, which comprises subjecting the mixture to the action of a liquid hydrogen fluoride solution of boron fluoride under conditions such that the principal action is the formation of an aromatic halide complex, separating the resultant upper and lower layers the latter comprising an aromatic halide complex, and subjecting the lower layer to heat to decompose the aromatic halide complex.

4. A process of separating aromatic hydrocarbons from mixtures of aromatic and non-aromatic hydrocarbons, which comprises subjecting the mixture to the action of a liquid hydrogen fluoride solution of boron fluoride under conditions such that the principal action is the formation of an aromatic halide complex, and separating the lower layer comprising an aromatic halide complex.

5. In a process of separating hydrocarbons, purifying an aromatic compound by treating it with a liquid hydrogen fluoride solution of boron fluoride to form an aromatic halide complex, separating the aromatic-halide complex from unreacted material, heating the complex, and driving off the boron fluoride and hydrogen fluoride and collecting the same.

6. In a process of separating hydrocarbons, purifying an aromatic compound by treating it with a liquid hydrogen fluoride solution of boron fluoride to form an aromatic halide complex, separating the aromatic-halide complex from unreacted material, heating the complex, and driving off the boron fluoride and hydrogen fluoride.

7. In a process of separating hydrocarbons, purifying an aromatic compound by treating it with a liquid hydrogen fluoride solution of boron fluoride to form an aromatic halide complex, separating the aromatic-halide complex from unreacted hydrocarbon material, and heating the complex.

8. In a process of separating hydrocarbons, purifying an aromatic compound by treating it with a liquid hydrogen fluoride solution of boron fluoride to form an aromatic halide complex in liquid form, and separating the liquid aromatic-halide complex from the unreacted hydrocarbon material.

9. In a process of treating a hydrocarbon illuminating distillate to improve the illuminating qualities thereof, subjecting a hydrocarbon illuminating distillate containing aromatic hydrocarbons to the action of a liquid hydrogen fluoride solution of boron fluoride, separating the resultant upper and lower layers the latter comprising an aromatic halide complex, subjecting the lower layer to heat to decompose the aromatic halide complex, and driving off the boron fluoride and hydrogen fluoride and collecting the same.

10. In a process of treating a hydrocarbon illuminating distillate to improve the illuminating qualitites thereof, subjecting a hydrocarbon illuminating distillate containing aromatic hydrocarbons to the action of a liquid hydrogen fluoride solution of boron fluoride, separating the resultant upper and lower layers the latter comprising an aromatic halide complex, subjecting the lower layer to heat to decompose the aromatic halide complex, and driving off the boron fluoride and hydrogen fluoride.

11. In a process of treating a hydrocarbon illuminating distillate to improve the illuminating qualities thereof, subjecting a hydrocarbon illuminating distillate containing aromatic hydrocarbons to the action of a liquid hydrogen fluoride solution of boron fluoride, separating the resultant upper and lower layers the latter comprising an aromatic halide complex, and subjecting the lower layer to heat to decompose the aromatic halide complex.

12. In a process of treating a hydrocarbon illuminating distillate to improve the illuminating qualities thereof, subjecting a liquid hydrocarbon illuminating distillate to the action of a liquid hydrogen fluoride solution of boron fluoride to form two liquid layers, and separating the lower layer from the upper layer.

13. A process of separating aromatic hydrocarbons from petroleums and hydrocarbon distillates comprising aromatics, which comprises admixing said material with 5 to 300 volume percent of a hydrogen fluoride solution of boron trifluoride at a temperature of —25 to 150° C. and at a pressure to maintain at least the major portion of the fluoride in liquid form at the temperature employed, said conditions being such that the fluoride forms a complex with said aromatics which is immiscible with the non-aromatics as the principal action, permitting the non-aromatics and the aromatics-fluoride complex to stratify into two layers, and separating the two layers.

14. A process of separating aromatic and non-aromatic hydrocarbons, which comprises treating a mixture of aromatic and non-aromatic hydrocarbons with 5 to 300 volume percent of liquid hydrogen fluoride in which is dissolved ½ to 50 mol per cent boron trifluoride, said treatment being carried out at a temperature of 0° to 50° C. and at a pressure to maintain the fluoride in liquid form at the temperature used, said conditions being such that the fluoride forms a complex with said aromatics which is liquid but immiscible with the non-aromatic hydrocarbons as the principal action, separating the aromatics-fluoride complex from the non-aromatic hydrocarbons, and separating the fluoride from the aromatics.

ROBERT E. BURK.